June 16, 1959 H. L. R. SMYTH 2,891,195
LAMP FLASHER WITH DAYLIGHT-RESPONSIVE INHIBITING MEANS
Filed Dec. 3, 1957 2 Sheets-Sheet 1

INVENTOR
HENRY LYALL ROSS SMYTH
by K. J. Filipkowski
AGENT

INVENTOR
HENRY LYALL ROSS SMYTH
AGENT

United States Patent Office 2,891,195
Patented June 16, 1959

2,891,195

LAMP FLASHER WITH DAYLIGHT-RESPONSIVE INHIBITING MEANS

Henry Lyall Ross Smyth, Ottawa, Ontario, Canada, assignor to National Research Council, Ottawa, Ontario, Canada, a body corporate of Canada Application December 3, 1957, Serial No. 700,391

19 Claims. (Cl. 315—159)

This invention concerns switching circuits for intermittently flashing navigational marker lights, and in particular relates to a novel circuit employing transistor devices for controlling the length and periodicity of flashes of electric lamps and including light responsive monitor devices for discontinuing the flashing during daylight hours.

The present application is a continuation-in-part of my co-pending application Serial No. 657,365, filed May 6, 1957.

In general the intermittently illuminated types of navigational marker lights carried on buoys or sited at unattended shore installations are most reliably operated from a battery source of electric supply. Such lights usually operate with a very low duty cycle, for example flashes having durations of less than a second are emitted at the rate of one every three to six seconds. Heretofore the replacement of batteries at remote locations, and the initial cost and maintenance of motor driven switch devices, have contributed to the relatively high annual expense of operating a marker. The unreliability or impracticality of existing photoelectric controls has not assured of realizing economies of supply by shutting down the operation during daylight hours. It is understood that for efficiency a photoelectrically controlled switch must itself not draw an appreciably large current from the battery and in addition the light-responsive control should have "fail-safe" characteristics. In other words, if the photoelectric element becomes defective, the flashing circuit must continue to operate just as well as before.

The type of sunlight responsive switch most commonly in use comprises a pair of differential expansion mechanical elements, and depends for its operation on the absorption of heat from the sun's rays by a blackened element, with resultant expansion exceeding that of a non-absorbing element, whereby to produce a magnified displacement of a lever arm coupled between them to open electrical contacts in the supply circuit. This type of switch has been found critical of adjustment and troublesome to maintain. It functioned positively only on bright days, and in the transition between fully closed contact and fully open contact states was susceptible of erratic operation and gave unreliable switching performance. Such device was therefore far from serviceable when used anywhere but on fixed shore lights with stable platforms and failed to perform properly when used on buoys. Accordingly the important group of buoy-mounted navigational marker lights have required much more frequent replacement of batteries since no reliable and effective daylight control was available.

The present invention is directed in part to the satisfying of the requirement for a reliable, efficient and relatively low cost light-responsive control for limiting lamp operation to periods of darkness and accordingly has as its principal object the provision of a daylight-responsive control for initiating flashing shortly after sunset and terminating the operation shortly before full daylight.

A concomitant object is the provision of a daylight-responsive flashing control circuit which does not affect the flasher cycles in the event that the photosensitive device fails.

It is a concomitant purpose of the invention to substitute novel cyclic flash controlling arrangements employing transistors in special circuit relation for stably controlling the duration and periodicity of lamp flashes, including monitor means responsive to daylight to discontinue the flashing.

In accordance with the invention, a navigational light flash control includes a free-running multi-vibrator timing circuit employing transistors whose output controls a switching transistor device, which in turn drives means closing a supply circuit for a navigational light, and further includes a daylight-responsive two-terminal monitor device in the form of a photocell which may comprise a voltage generating cell of the semi-conductor type connected in the multivibrator circuit to bias it to a stable state for which the light is de-energized when the ambient intensity of daylight is sufficiently high. Alternatively the control may include a photoconductive light cell associated with the circuit closing means to effectively disconnect the lamp circuit when the intensity of daylight exceeds a predetermined value. In the latter embodiment the switching transistor device drives supply circuit closing means which take the form of an electro-magnetic relay whose armature operates lamp circuit contacts, the relay winding being energizable in parallel from a photoconductive cell in series with the battery supply.

An alternative embodiment of a switching means with daylight control for larger lamp keying takes the form of one or more switchable transistor devices, whose emitter-collector paths are in series with the lamp across the supply keyed by the switching transistor, and a daylight responsive cell may comprise either a two-terminal voltage generating photocell, connected in the multivibrator circuit to bias it in one stable state, or may comprise a two-terminal photoconductive cell responsive to daylight to operate a relay from the supply to disable the entire flash timing circuit.

In carrying the invention into effect, a pair of transistors have their bases and collectors cross coupled by series-connected resistive and capacitive elements in a multivibrator type of circuit whose output controls the base current of the switching transistor, and accordingly controls the current flowing in the collector circuit. In a first embodiment a relay winding energized by the switching transistor collector current controls contacts to prevent the light from going on when the switching transistor is biassed on.

A preferred daylight responsive control comprises a voltage generating light-sensitive cell as exemplified by the "sun battery" types of semi-conductor device including a pair of terminals, so connected in the multivibrator circuit as to bias the stable state for which the switching transistor is held conducting, and the lamp held de-energized under daylight levels of incident illumination. An alternative daylight responsive control comprises a two-terminal photoconductive cell such as a cadmium sulphide type, connected in parallel with the emitter-collector circuit whereby to hold the relay operated and thereby disable the lamp circuit when daylight intensity exceeds a given level. In carrying into effect the embodiment for keying larger lamps the collector current of the switching transistor is fed to a two stage amplifier whose final stage has its emitter-collector paths in series with the lamp across the supply. In this embodiment the voltage generating type of two-terminal photocell may be used, or a photoconductive daylight-responsive cell may be so connected as to energize a relay from the supply to disconnect operating potential from the remainder of the system.

For a more complete understanding of the invention the following description is to be read in conjunction with the accompanying drawing wherein.

Figure 4A:
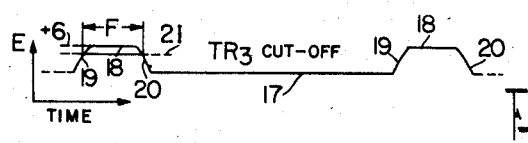
Figure 4B:
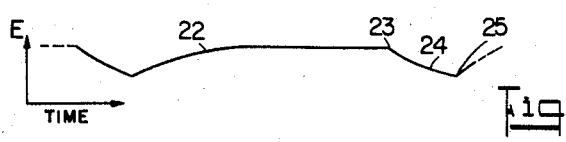
Figure 5:
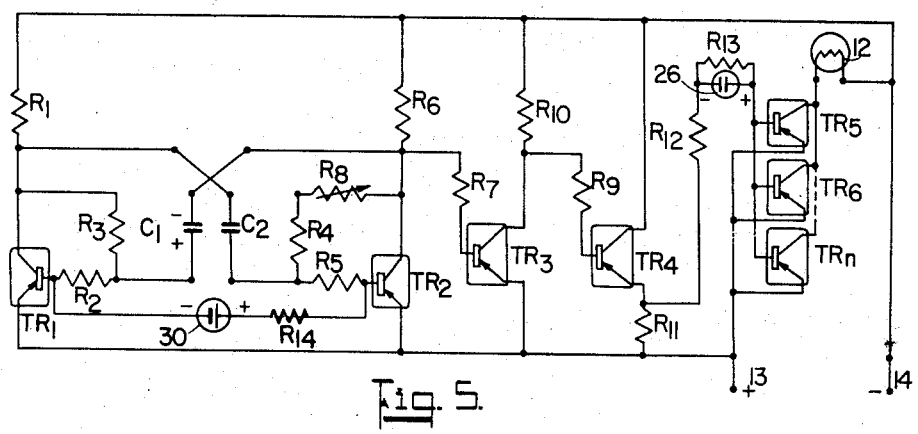
Figure 6:
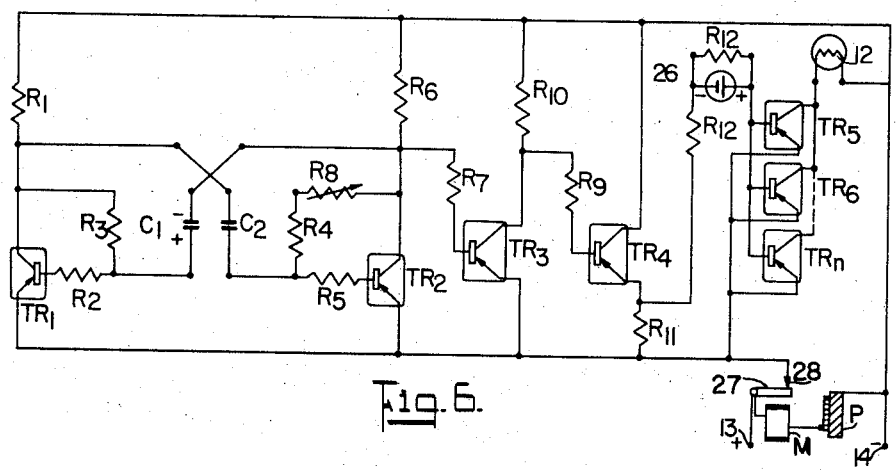
Figures 7, 8:
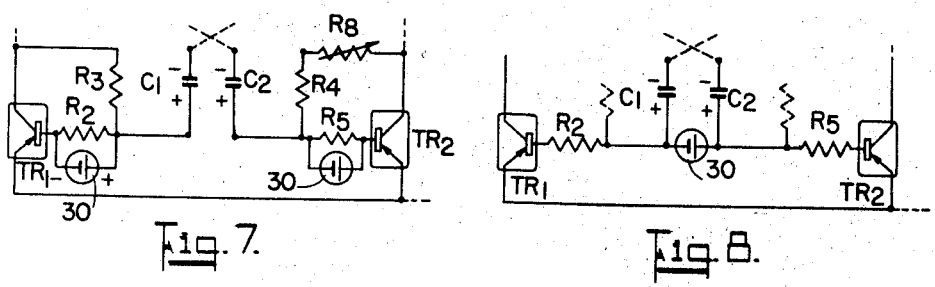

Figs. 4a and 4b respectively refer to the voltage waveforms at the collector terminals of the two stage multivibrator circuit;

Fig. 5 is a circuit diagram of an alternative flash timing system having no moving contacts in the flashing circuits, and including voltage-generating photocell daylight-responsive means to hold the lamp keying transistors biassed off in daylight hours;

Fig. 6 is a circuit diagram similar to Fig. 5 but substituting a photoconductive daylight-responsive cell and relay energized from battery in series with the cell to completely disconnect the control circuits from battery in daylight hours; and, Figs. 7 and 8 refer to alternative connections for a two-terminal voltage-generating photocell.

The development of transistors has progressed to a stage where they have satisfactory reliability for use in navigational aids and relatively low cost. However the temperature dependence of certain parameters has presented difficulties in realizing practical circuits to obtain a flash cycle in which the periodicity and duration of the flash do not change appreciably over a range of ambient temperatures experienced at the sites at which markers are installed. The switching performance is generally required to be satisfactory over a range of ambient temperatures from about −40 degrees to +100 degrees F., and operation down to −70 degrees F. is required in airborne applications.

Figure 1:
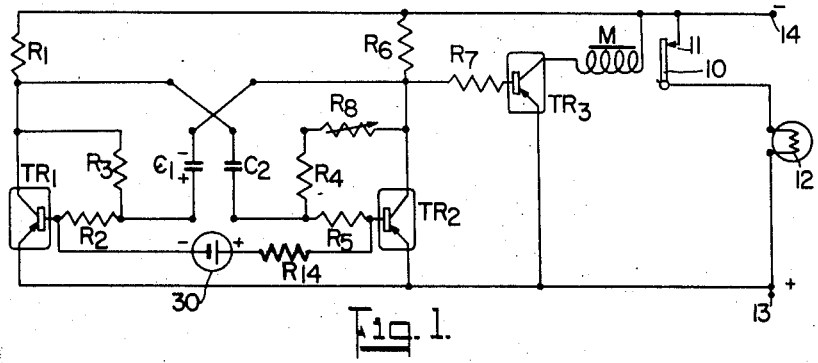
Fig. 1 is a schematic circuit diagram of flash timing system employing an electromagnetically operated flasher and a daylight responsive control of the sun battery, or voltage-generating type.

Referring to Fig. 1 a complete switching circuit exemplified in this diagram comprises a pair of like transistors of the PNP junction type labelled TR1 and TR2 interconnected in what may be generally referred to as a free-running multivibrator circuit arrangement, and includes a switching transistor TR3 controlled from the output of the multivibrator, taken from the collector of TR2. When TR2 is non-conducting TR3 is biassed "on." The collector of TR3 is connected to one end of the coil of relay M whose other end is connected to the negative supply conductor 14. Armature contact 10 of the relay is normally closed on contact 11 and when TR3 is biassed "on" the relay coil is energized, breaking the circuit of the lamp filament 12 connected in series with the contacts across the battery.

A two-terminal voltage-generating photocell 30 has its negative terminal connected to the base of TR1 and its positive terminal to the base of TR2, and is so located as to receive ambient daylight but not lamp illumination. Whenever the intensity of light incident on the cell is below a predetermined level, the cell has no output and therefore does not affect the bias of either base. The resistance R14 shown in series with the cell may be an inherent resistance or may be deliberately added for the purpose of adapting a cell normally having a dark resistance too low for satisfactory operation of the multivibrator. Under daylight conditions, or whenever the light incident on the cell exceeds some arbitrary intensity such as 8 foot candles, the negative terminal biasses the base of TR1 to hold it conducting while the positive terminal biasses TR2 off. Accordingly switching transistor TR3 is held fully on, to hold relay contacts 10 and 11 separated, and lamp 12 remains unenergized.

When the intensity of daylight falls below the predetermined level, the cell output voltage falls below the threshold control value of the multivibrator, and lamp keying ensues. An output voltage less than 100 millivolts has been found effective to stop the multivibrator.

The operation of the timing circuit may be examined by assuming that the circuit is suddenly energized by the application of battery potentials, for example derived from 6 volt D.C. battery supply (not shown) used for lighting the marker lamp, to connect positive supply to terminal 13 and negative to terminal 14. Resistors R1 and R6 in the collector circuits respectively of TR1 and TR2 are of substantially equal value, and capacitor C1 is several times larger than C2. Base current will accordingly tend at the first instant to flow in each transistor, the current flow through R2 and C1 gaining control while the base current of TR2 is quickly checked and ceases to flow until capacitor C1 is charged to a certain fraction of total battery potential. At this time the base current in TR1 falls to a low value. The capacitor C2 now begins to charge, and due to the potential rise at the collector end of resistor R1 the direct base current through this resistor falls rapidly to zero. At this stage TR1 is cut off and TR2 has become fully conducting. As a consequence the potential of the collector end of R6 becomes substantially that of the positive supply, and transistor TR3 has its base current cut off. Accordingly lamp 12 flashes on in response to de-energization of relay winding M. Since capacitor C2 is the smaller, the duration of the "on" time for TR2 is relatively less than the "on" time for TR1, hence the off time for TR3 is shorter than its "on" time. It will be apparent that the "on" condition of TR3 corresponds to the de-energized condition of lamp 12. Capacitor C1 which has previously been charged discharges through the resistor chain R1, R3, R6, while C2 is charging; the charging current of the latter is poled in the same direction as the discharge current of C1 through resistor R1. Therefore when equal potentials exist across each capacitor's terminals further discharge cuts off TR2 and C1 begins to charge. The multivibrator system continues to run as described, TR1 having longer duration "on" states.

In general the duration of the length of the flash is modifiable by adjustment of C1 and R3 while the Off time is a function of the values of C2 and R4. A rheostat R8 smaller than R4 is included in series therewith to permit control over a small range of the Off time. Resistors R2 and R5 are relatively low value resistors for the protection of the transistors against damage by transients which occur as the circuit flips from the flash to the off-time state and vice versa. Resistor R7 is likewise employed to protect TR3 and reduces the loading of TR3 on the timing circuit, being relatively smaller than either R2 or R5. The Off time can be increased substantially by increasing the value of R7. The use of low value collector and biassing resistances throughout the circuit and the returning of bias resistors R3 and the pair R4, R8 directly to the collectors of their respective transistors rather than to the supply bus provides sufficient degeneration of the circuit to compensate for extreme temperature variations. By this provision it has been made possible to stabilize the flash cycle to substantially constant duration and period of flash over the temperature range of about −40° F. to about +100° F., and in fact to attain satisfactory operation somewhat beyond the extremes of the range.

The relay M is chosen to have resistance and operative current characteristics such that a dissipation of only a few milliwatts in the winding suffices to hold contacts 10 and 11 closed, and to release on a current differential which is a small fraction of a milliampere, while its contacts are rated to interrupt resistive lamp currents of several amperes at 6 or 12 volts D.C.

Figure 2:
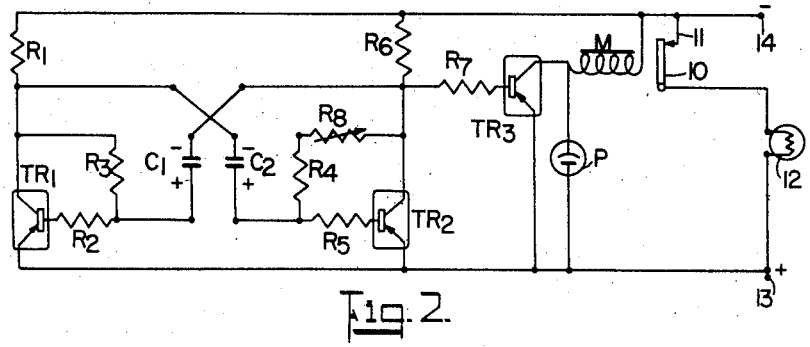
Fig. 2 is a schematic circuit diagram similar to Fig. 1 but substituting a photoconductive cell in series with the winding of the lamp circuit closing relay across the supply.

An alternative daylight-responsive lamp switching system is schematically illustrated in Fig. 2, wherein the monitor photocell P, which is of the photoconductive passive type, is connected in series with the winding of M across the supply. The cell resistance-versus-incident light intensity characteristics are preferably such that it presents an extremely high resistance for the dark state but at a certain light level the resistance falls to a value sufficiently low to pass enough current through the winding to operate the relay, holding the lamp circuit open. The current drain of the relay therefore is added in this embodiment to the current drain of the transistors which continue to operate in cyclic manner as described. Should the cell P fail, the operation of relay M by the multivibrator and TR3 is not affected and the device therefore fails "safe." In such event the lamp will flash continuously until the situation is corrected.

Figure 3:
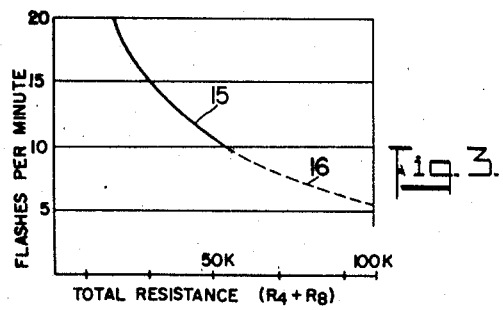
Fig. 3 is a graph showing the control of the flash periodicity by adjustment of certain values of the circuit elements of Fig. 1.

Fig. 3 diagrams the relationship between the total resistance offered by R4 and R8 and the number of flashes per minute produced by the circuit. The solid line 15 extends over a range in which the adjustment of flash rate is preferably made by resistance control at all ambient temperatures normally likely to be encountered. Dashed line 16 extends over that part of the range in which the low-temperature operation tends to be unstable with the large values of resistance required, hence the variation of size of C1 is preferred for achieving the lower rates. At these slower rates of flashing the sum of R4 and R8 is kept relatively low and C1 may be very considerably increased.

Referring now to Figs. 1 and 2 in conjunction with Figs. 4a and 4b, the voltage variations with time at the respective collectors of TR2 and TR1 may be compared. From the cut-off condition the potential rises steeply at 19 to substantially full positive value and remains steady at 18. Above a certain level indicated at 21 the relay current through TR3 drops to close contacts 10, 11 whereby the battery is connected to flash the lamp. As C2 begins to discharge the collector of TR2 rapidly falls to negative supply value and remains steady as indicated by the portion 17. The slowly rising potential curve 22 of the collector of TR1 is due to the finite charging time of C1 through its resistive series charging circuit, and terminates at 23 as TR2 goes on and C2 commences to charge. The TR1 collector potential drops more rapidly from full positive along curve 24 and terminates at a less positive level at 25, when TR1 again switches on.

The embodiment of Figure 5 eliminates all moving contacts from the flashing circuit and daylight-responsive controls in a device incorporating a free-running multivibrator flash timing circuit, the contacts 10 and 11 being replaced by a further transistor switching stage TR4 controlling the base currents of the final group TR5, TR6 . . . TRn connected in parallel to carry the lamp current. The organization of this embodiment is substantially identical with that of the Fig. 1 embodiment with the exception that in this circuit larger current loads of a lamp or lamps of higher power are keyed by a larger transistor or by a relatively larger group of transistors, in series with the lamp or lamps and battery.

In this embodiment the base of transistor TR4 is coupled by means of low impedance resistor R9 to the collector of switching transistor TR3, whose load is R10. When TR3 is biassed off, TR4 draws base current through R9 and R10 and the potential of the emitter end of R11 is maintained negative by the current flow in TR4 via R11 and R12. Current flows through the small resistor R12 out of the bases of the paralleled group TR5, TR6 . . . TRn. As the latter transistors are therefore strongly biassed on they represent the closed circuit condition for the circuit of lamp filament 12 and it therefore lights. When TR4 is biassed off as TR1 and TR3 go on, the potential of the bases of the group TR5, TR6, . . . TRn rises and base current falls to a low value, therefore the flashing circuit is switched off The base current of the final stages of the Fig. 5 and Fig. 6 embodiments may further be reduced and the collector current brought to a negligible value by the use of the bias cell 26 with its bleeder R13 interposed. Improved battery life results from the interposition of such auxiliary bias means with transistors of such characteristics, as compared with a keying circuit not including the bias provision. Under the flash condition when current is drawn by the bases of the switching group TR5, TR6, . . . TRn, the bias battery, which is preferably a potential-generating device having low energy storage capacity, is charged to its full bias potential, which may be of the order of 1.5 volts, poled with the positive terminal connected to the bases and opposing the supply. During the off time the base current is reduced very considerably below the value it would have without bias cell 26 by virtue of the opposing voltage, with the result that an economy of base current is realized. The bias cell is advantageously used with transistors which do not inherently have sufficiently low currents in the bias state wherein the base is at emitter potential.

As another result the switching transistor group is more nearly completely cut off than in the absence of the cell, and a residual current that would tend to flow in the lamp filament circuit, ordinarily many times larger than the residual base current is thereby prevented from flowing. The bleeder resistor R13 is chosen of such value as to dissipate the accumulated energy at a rate to prevent overcharging in any long period of running and not so low as to damage the cell.

While the embodiments of Figs. 5 and 6 have been described as including a stage TR4, the final stage may have its bases resistively coupled as by connecting the lower end of R12 to the collector of switching transistor TR3, with the switching performance substantially as outlined hereinbefore, particularly where TR3 is chosen to have a relatively high collector current adequate to permit control of the base currents of a group of larger final stage transistors.

The circuit of Figure 6 is preferred in those applications where larger lamps and heavier lamp currents must be operated with the best possible reliability and requiring the least amount of attention and battery replacement. Monitor photocell P is in circuit with relay M, which in the operated condition under daylight opens the negative supply connection to the circuits and therefore the drain due to the transistors is zero. With contacts 28, 27 open there is no current from the supply to the control and flashing circuits. Should cell P become inoperaive the contacts 28, 27 remain closed and the lamp flashing circuit remains effective, but the flashing will not be discontinued during daylight hours. In due course the defect will normally be observed by craft to advise maintenance crews.

In specific embodiments of Figs. 1 and 2 the values of components found effective were as follows:

| | |
|---|---|
| R1, R6 | 3.3 kilohms. |
| R2, R5 | 1 kilohm. |
| R3, R4 | 33 kilohms. |
| R7 | 120 ohms. |
| R8 | 67 kilohms variable. |
| C1 | 100 microfarads. |
| C2 | 25 microfarads. |
| TR1, TR2, and TR3 | Type 2N130 PNP transistors made by Raytheon Mfg. Corp'n. |
| Cell P | Cadmium sulphide photoresistive cell Type PC1-04; manufactured by the Marconi Company. |
| Cell 30 | International Rectifier Corporation Type B2M "Sun Battery" selenium cell. |
| Relay M | Potter & Brumfield type 225D with windings paralleled for 2500 ohms. |

The foregoing elements in circuit arrangement according to Figs. 1 or 2 operated a light having a flash current up to 1.5 amperes at 6 volts with an average supply current drain apart from the lamp of 3 milliamperes in daylight and 1.5 milliamperes at night. The circuit was turned off by cell P about 15 minutes before sunrise and went on about 15 minutes after sunset. Such units operating in the summer months showed a duty factor of about 30% On-time out of 24 hours, and under winter operating conditions were On for about 65% of the day.

Actual values for successful embodiments of the circuits of Figs. 5 and 6 were substantially as indicated for the embodiments described above, with the additions and changes set out below:

| | |
|---|---|
| C2 | 30 microfarads. |
| R7 | 330 ohms. |
| R9 | 120 ohms. |
| R10 | 1500 ohms. |
| R11 | 2200 ohms. |
| R12 | 56 ohms. |
| R13 | 330 ohms. |
| TR4, TR5, TR6 ... n | Texas Instrument Company type 355 transistors. |

The operating current for the transistor circuit under night conditions, excluding the lamp current, averaged 6 milliamperes. With the bias cell removed the average current was found to rise to 25 milliamperes.

The manner in which a two-terminal voltage-generating light-responsive device may be connected in the multivibrator circuit to exercise a control, in addition to the connection of Fig. 1, is set out by Figs. 7 and 8. In Fig. 7 a pair of monitor cells 30 of substantially similar characteristics of output voltage versus incident light, are connected across the base biassing resistors of TR1 and TR2, with the negative terminal of the cell paralleled with R2 connected to the base of TR1, and the positive terminal of the cell paralleled with R5 being connected to the base of TR2. Depending on the desired threshold level of light at which it is desired that the multivibrator be stopped, a single cell may be connected as described across R5 to hold TR2 off under daylight. In Fig. 8, a single monitor cell is shown connected between the ends of the base resistors R2 and R5, the negative terminal being connected to the base of TR1. With a commercial type of selenium voltage generating cell it was observed that the dark resistance was high and under full sunlight became relatively low, so that the cell had no effect on the timing during hours of darkness, but effectively locked the circuit to one stable state under light of the order of 10 foot candles for any of the connections illustrated.

It is immaterial whether the nature of the illumination is light or radiated heat, provided that the responsive element is capable of generating a voltage related in some manner to the intensity of incident radiation. For example, the use of a thermo-operating junction of dissimilar materials such as a thermocouple device may be resorted to as alternatives under the invention. In general, any two-terminal monitor device having a voltage-output related to a parameter of its environment, which parameter is to be used in the control of a switching system, may be employed similarly to exert a biassing effect on the bases of elements TR1 and TR2 in a multivibrator oscillator form of timing control.

While the use of a passive photoresistive type of monitor light cell has been indicated for certain of the embodiments employing relays, the operation of such relays may be aided by the use of cells manifesting a decrease of resistance while at the same time generating a voltage with increase in incident illumination. Such cells preferably are poled in series aiding connection with the supply in the relay circuit.

It will be readily understood that by suitable choice of the number and type of paralleled transistors in the lamp circuit switching stage the majority of larger signalling lights may be flashed periodically during the hours of darkness, the lamp circuits carrying flash currents as high as several amperes while the control systems according to the invention require an average supply current of only a few milliamperes.

While the present invention has been described with particular reference to switching circuits operated with low duty cycles of On time, systems may also be devised within the scope of the invention to energize lights or apparatus for intervals which are relatively long compared with periods of de-energization by the expedient of taking a control signal from the collector of TR1 rather than TR2 as described. Moreover, the actual form of utilization load circuit is not limited to electric lamps, but may take any practical form such as article of material feeding apparatus for gas, vapour, liquid, or solids handling; and stepping motors or continuous motors of any type, controllable by a relay employed in the load circuit.

I claim:

1. A flash control circuit for a lamp comprising a free-running multivibrator oscillator including a first and a second transistor having their respective base and collector electrodes cross-coupled by series-connected capacitive and resistive impedance elements and their emitter-collector paths connected by resistive impedance means across a source of polarizing voltage, a third transistor having a base and an emitter-collector path including a load, means connecting said source across said path, the collector of the second transistor being adapted to deliver a bias voltage alternating between a higher and a lower potential to the base of said third transistor for respectively keying said third transistor off and on, a switch in series with said lamp and said source, means controlled by said load adapted to open said switch when a predetermined current flows in said load, a two-terminal monitor device disposed for incidence of ambient illumination and responsive to the intensity of light input to vary the magnitude of an electrical quantity measurable between said terminals, and means connecting said terminals in said circuit whereby to cause said predetermined current to flow in said load in response to predetermined intensity of said input.

2. A control circuit as in claim 1 wherein said monitor device exhibits decrease of resistance with increase of light input and said terminals are connected between the emitter and collector of said third transistor, said load comprises a relay winding, and said switch comprises normally closed contacts actuated by said relay.

3. A control circuit as in claim 1 wherein said monitor doevice is a voltage generating cell having its positive terminal connected in the multivibrator oscillator to the base of said second transistor and its negative terminal connected to the base of the first transistor, said load comprises a relay winding, and said switch comprises normally closed contacts actuated by said relay.

4. The combination of claim 1 wherein said switch comprises the emitter-collector path of at least one transistor having a base, an emitter, and a collector, and includes a base current control circuit whose effective resistance is adjustable connected in series with the emitter-base path of said at least one transistor and said source.

5. The combination of claim 1 wherein said control circuit resistance comprises the emitter-collector path of a fourth transistor and is adjustable between a maximum and a minimum value corresponding respectively to the fully biased off and the fully biased on states of said fourth transistor, whereby to respectively de-energize and energize said lamp.

6. The combination of claim 4 wherein said monitor device is a voltage generating cell having its positive terminal connected to the base of said second multivibrator transistor and its negative terminal connected to the base of the first transistor, whereby to bias said first and second transistors respectively on and off when the voltage exceeds a predetermined minimum.

7. The combination of claim 1 wherein said load comprises a resistance and said switch comprises a plurality of lamp-keying transistors having the emitter-collector paths of each in series with said lamp and said source and having their like electrodes connected in parallel, and having common bias means coupling the base of each with the collector of said third transistor whereby to bias said keying transistors off when predetermined current flows in said load.

8. A free-running multivibrator comprising a first transistor and a second transistor each having a base, emitter and collector electrodes and a base electrode lead, means to connect a current source for polarizing each emitter positively, first capacitance means cross-connecting the collector of said second transistor with the base lead of the first transistor, second capacitance means cross-connecting the collector of the first transistor with the base lead of the second transistor, first and second load resistance means having their one ends respectively connected to the collectors of said first and second transistors, means for polarizing the other ends of said load resistance means negatively from said source, and individual shunt resistance means interconnecting the base lead and collector electrode of each of said transistors.

9. A multivibrator as in claim 8 wherein the value of said shunt resistance means lies in the range from a fraction of the value of said load resistance to a multiple thereof including equality.

10. A multivibrator as in claim 8 wherein said capacitance means are variable.

11. A multivibrator as in claim 8 wherein said shunt resistance means are variable.

12. A multivibrator as in claim 8 wherein the said base leads comprise resistance means whose value lies in the range from a fraction of the load resistance to a value equal to the load resistance.

13. A multivibrator as in claim 8 including a two-terminal control device capable of developing a difference of potential therebetween in response to a change in physical state of said device, means connecting a respective terminal to each of said base leads, whereby to maintain the said multivibrator in one stable state when said potential difference exceeds a predetermined minimum.

14. A multivibrator as in claim 13 wherein said device is a voltage generating light responsive cell.

15. A multivibrator as in claim 13 wherein said device is a thermocouple.

16. A keying waveform generator comprising a first transistor and a second transistor, each having an emitter and a collector electrode and a lead from a base electrode, means connecting a current source for positively biassing said emitters, first capacitance means connected between the base lead of said first transistor and the collector electrode of the second transistor, second capacitance means connecting the base lead of the second transistor with the collector of the first transistor, first and second load resistance means, means to connect said load resistance means respectively between the collector electrodes of said transistor and the negative pole of said source, a shunt resistance means interconnecting the base lead with the collector electrode of each of said transistors, and means to deliver a keying waveform output.

17. A generator as in claim 16 wherein said means to deliver an output comprises a third transistor having its emitter polarized positively and a base electrode connected to a collector of said first transistor and having load means disposed in series circuit relation with said negative pole and the emitter-collector path of said third transistor.

18. A generator as in claim 16 including a two-terminal control device capable of developing a difference of potential therebetween in response to a change in the physical state of the device, means connecting a respective terminal to each of said base leads, whereby to maintain the said generator output steady and non-varying when said potential difference exceeds a predetermined minimum.

19. A flash control circuit as in claim 1 wherein said two-terminal monitor device comprises a device having a resistance value functionally related to the said input having one terminal connected with said source, a relay having one winding terminal connected with the second terminal of said monitor device and another winding terminal connected with said source, and contact means operable on energization of said relay from said source through said monitor device effective to disable said control circuit.

References Cited in the file of this patent

UNITED STATES PATENTS

| | | |
|---|---|---|
| 1,980,037 | Chase | Nov. 6, 1934 |
| 2,538,536 | Ritchie | Jan. 16, 1951 |
| 2,776,420 | Woll | Jan. 1, 1957 |
| 2,827,574 | Schneider | Mar. 18, 1958 |
| 2,829,257 | Root | Apr. 1, 1958 |